Patented Aug. 22, 1950

2,519,450

UNITED STATES PATENT OFFICE 2,519,450

THEOPHYLLINE - MONOAMINOBENZOIC ACID-ALKALI METAL HYDROXIDE REACTION PRODUCT

Irvine W. Grote and John W. Le Maistre, Chattanooga, Tenn., assignors to The Chattanooga Medicine Company, Chattanooga, Tenn., a corporation of Tennessee No Drawing. Application January 11, 1949, Serial No. 70,371

9 Claims. (Cl. 167—67)

This invention relates to a stable, water-soluble composition containing theophylline or an active theophylline product.

Theophylline (also known as 1,3,dimethylxanthine) is used primarily as a diuretic but is also employed as a myocardial stimulant and as a coronary dilator. The limited solubility of theophylline in water, on the order of 0.44 g./100 ml. water at 15° C., and 1.3 g./100 ml. water at 37° C., limits the usefulness of this drug. The solubility of theophylline can be increased somewhat by producing the sodium or potassium salt of the drug, these alkali metal salts having solubilities in the range from about 5 to 10 g./100 ml. water. The use of the alkali metal salts of theophylline has the disadvantage that a saturated solution prepared from such salts has a relatively high alkaline pH, in the neighborhood of 11.0 and higher.

It has been previously suggested that theophylline should be used in the form of a double salt of theophylline with some solubilizing agent. Merck's Index mentions, as such solubilizing agents, calcium salicylate, diethanolamine, ethylene diamine, sodium acetate, and sodium salicylate.

The theophylline-ethylene diamine double salt is now on the market in the form of solutions preserved in sealed ampoules to exclude the carbon dioxide of the air, which precipitates free theophylline from solutions of the theophylline-ethylene diamine double salt. The double salt is also sold in tablet or powder form. When such a double salt is taken orally, the salt is immediately decomposed by the acid in the stomach, releasing free theophylline, which often results in gastric distress and nausea. The other known double salts of theophylline are similarly decomposed in the stomach with frequent production of gastric distress and nausea.

An object of the present invention is to prepare a theophylline composition having a high degree of solubility in water.

It is another object of the invention to provide a theophylline composition which is stable against any tendency to be precipitated by the carbon dioxide of the air.

A further object of the invention is to provide a theophylline composition which may be administered orally without causing gastric distress or nausea.

We have found that a highly stable, highly water-soluble theophylline composition occurs when a mono-aminobenzoic acid such as para-aminobenzoic acid and theophylline are reacted with an amount of an alkli metal hydroxide such that the theophylline is incompletely reacted with the alkali but the para-aminobenzoic acid is substantially completely neutralized to form in admixture an alkali metal salt of the para-aminobenzoic acid, an alkali salt of theophylline, and unreacted theophylline, but preferably no free alkali. The amount of alkali to be used is regulated such that the composition contains approximately 30% (molar) of free theophylline. The corresponding percentage by weight is 47% in terms of free theophylline, or 52% in terms of theophylline monohydrate. The most suitable compositions are those containing 45-55% by weight of free theophylline. Expressed in another way, not more than about 70% (molar) of the theophylline concentration of the final product should be present as the alkali metal salt.

In carrying out the preparation of the composition herein described, we may start with either a free mono-amino benzoic acid of either ortho-, meta-, or para structure or its sodium or potassium salt. To one molecular proportion of the free mono-aminobenzoic acid compound, we add about one molecular proportion of theophylline. Next, between one and two molecular proportions of an alkali, such as potassium hydroxide or sodium hydroxide, is added to the mono-aminobenzoic acid and theophylline mixture. Since the mono-aminobenzoic acids are relatively strong acids, it may be assumed that the primary reaction occurs between the alkali and the mono-aminobenzoic acid, resulting in the formation of the alkali metal salt. Since there is an excess of alkali, the reaction also yields an alkali metal derivative of theophylline. We prefer to use less than two moles of alkali per mole each of theophylline and mono-aminobenzoic acid, since we have found that if the reaction proceeds to complete neutralization of the mono-aminobenzoic acid and to complete formation of an alkali metal salt of the theophylline, the resulting pH is higher and the solubility of the compound lower, both being undesirable. It should be noted that the use of less than two moles of alkali per mole each of para-aminobenzoic acid and of theophylline will not cause complete formation of the theophylline salt, but we have found that approximately 52% by weight of the theophylline (calculated as the monohydrate) is present under these conditions. In practice, we prefer to use about 85% of the theoretical amount, i. e. 85% of two moles, of the alkali necessary for complete reaction. After the addition of the alkali, the solution is evaporated in vacuo, resulting in the production of a practically white cake. The resulting cake is crushed and redissolved in water.

A solubility of our composition on the order of 15 to 50 grams per 100 milliliters of solution at 28° C. is obtained. This corresponds to a free theophylline content of about 8 to 24 g. of anhydrous theophylline per 100 ml. of solution. The saturated solution has a pH in the range from about 9.2 to 9.5. A saturated soluion of the potassium salt thus prepared exposed to the air overnight does not precipitate from the effect of carbon dioxide, and may be stored for indefinite periods of time without evidences of precipitation.

The toxicity of the resulting product is no higher than that of theophylline preparations having comparable amounts of theophylline present.

A furter advantage of the present invention lies in the taste of the composition, which is faintly bitter but not at all unpleasant.

We prefer to use potassium hydroxide as the alkali due to the somewhat higher solubility shown by the potassium salt over the sodium salt. Furthermore, since the human body in most cases is furnished an excess of sodium-containing compounds, it is beneficial to employ the potassium hydroxide reaction products for pharmaceutical purposes.

An advantage of the present composition over the previously known double salts of theophylline with sodium acetate or sodium salicylate lies in the fact that only one molecular proportion of the mono-aminobenzoic acid is required for each molecular proportion of theophylline. In the case of the solubilizing agents previously employed, the mole ratio of solubilizing agents to theophylline has been considerably higher.

The composition of the present invention is also more stable to alkaline hydrolysis than those heretofore prepared.

The following specific examples will illustrate the preparation of the composition disclosed in this invention.

Example 1

One-tenth mole of theophylline and one-tenth mole of para-aminobenzoic acid were mixed into water and a solution of sodium hydroxide was added slowly until complete solution occurred at room temperature. The alkali required was 0.16 mole, or 80% of that theoretically required to combine with both the acid and the theophylline. The pH of the solution was 9.2 and it contained 9 grams of anhydrous theophyyline (10 grams of the monohydrate) per 100 milliliters of solution. On evaporation in vacuo, a nearly white cake was obtained, which after powdering was redissolved in water to the extent of 5 grams per 32 milliliters of solution.

Example 2

One-tenth mole (18.2 grams) anhydrous theophylline and 0.1 mole (13.7 grams) para-aminobenzoic acid were mixed with 150 milliliters water and treated with a solution of potassium hydroxide. The solids were completely dissolved when 0.174 mole of potassium hydroxide had been added. The pH of the solution was 9.1. The solution was evaporated in vacuo and the resulting white residue crushed. The crushed product was dried at 110° C., and was found to dissolve readily in water to the extent of 5 grams in 11.0 milliliters of solution. The saturated solution had a pH of 9.4.

Example 3

One mole of anthranilic acid, one mole of theophylline, and 1.62 moles of potassium hydroxide were reacted together, and the solution evaporated. The product had a solubility of 48 grams per 100 milliliters of solution, equivalent to 23 grams anhydrous theophylline per 100 milliliters of solution. The saturated solution had a pH of 9.22.

Example 4

0.5 mole of para-aminobenzoic acid, one mole of theophylline and 1.2 moles of potassium hydroxide were reacted together and the solution evaporated. The solubility of the product was 21.8 g. per 100 milliliters of solution and the saturated solution had a pH of 9.12. This concentration is equivalent to 13.4 grams anhydrous theophylline per 100 milliliters.

The following table illustrates the effect of varying the proportion of potassium hydroxide:

| Moles | Moles Theophylline | Moles | Solubility-grams of anhyrdous theophylline per 100 ml. of solution | pH of saturated solution |
|---|---|---|---|---|
| 1 | 1 | 1.00 | very low | |
| 1 | 1 | 1.25 | do | 8.17 |
| 1 | 1 | 1.50 | below 10 | 9.05 |
| 1 | 1 | 1.62 | 25 | 9.35 |
| 1 | 1 | 1.75 | 24 | 9.50 |
| 1 | 1 | 2.00 | 18 | 9.91 |

As previously mentioned, we prefer to react equimolar proportions of the mono-aminobenzoic acid and theophylline with less than two moles of the alkali. When 1.7 molecular proportions of potassium hydroxide are used per equimolar parts of the other constituents, the free theophylline content of the mixture is approximately 52% by weight (calculated as the monohydrate, corresponding to 47% anhydrous theophylline).

The composition is preferably employed as a saturated solution in ampoules, where the drug is to be administered by intramuscular injection.

The drug may also be used in dry form by admixture with suitable diluents, such as milk sugar.

It is evident that many modifications of the composition proposed herein may be made without departing from the spirit of the invention, and it is not our intention to limit the invention other than necessitated by the scope of the appended claims.

We claim as our invention:

1. A composition containing, per 100 milliliters of solution, at least 15 grams of the reaction product of theophylline, a mono-aminobenzoic acid, and an alkali metal hydroxide, said reaction product containing about 30 mole percent free theophylline.

2. A composition containing, per 100 milliliters of solution, at least 15 grams of the reaction product of theophylline, a mono-aminobenzoic acid, and an alkali metal hydroxide, said reaction product containing about 30 mole percent free theophylline, said solution having a pH in the range from 9.2 to 9.5.

3. A composition comprising the reaction product of one molecular proportion of theophylline, one molecular proportion of a mono-aminobenzoic acid, and less than two molecular proportions of an alkali metal hydroxide, said composition having a free theophylline content in the range from 45–55% by weight, and a solubility in water of at least 15 grams per 100 milliliters of solution.

4. A composition comprising the reaction mixture of a mono-aminobenzoic acid, theophylline, and an alkali metal hydroxide.

5. A composition comprising a reaction mixture of a mono-aminobenzoic acid, theophylline, and potassium hydroxide.

6. A composition comprising a reaction mixture of a mono-aminobenzoic acid, theophylline, and sodium hydroxide.

7. A composition comprising a saturated aqueous solution of the reaction product of a mono-aminobenzoic acid, theophylline, and an alkali metal hydroxide, said solution having a pH from 9.2 to 9.5.

8. A composition comprising a saturated aqueous solution of the reaction product of a mono-aminobenzoic acid, theophylline, and potassium hydroxide, said solution having a pH from 9.2 to 9.5.

9. A composition comprising a saturated aqueous solution of the reaction product of a mono-aminobenzoic acid, theophylline, and sodium hydroxide, said solution having a pH from 9.2 to 9.5.

IRVINE W. GROTE.
JOHN W. LE MAISTRE.

REFERENCES CITED

The following references are of record in the file of this patent:

UNITED STATES PATENTS

| Number | Name | Date |
|---|---|---|
| 2,066,731 | Kropp | Jan. 5, 1937 |

FOREIGN PATENTS

| Number | Country | Date |
|---|---|---|
| 629,662 | Germany | May 8, 1936 |
| 638,030 | Germany | Nov. 7, 1936 |